US007062723B2

(12) United States Patent
Smith et al.

(10) Patent No.: US 7,062,723 B2
(45) Date of Patent: Jun. 13, 2006

(54) SYSTEMS, METHODS AND APPARATUS FOR MAGNIFYING PORTIONS OF A DISPLAY

(75) Inventors: Kim C. Smith, Dove Canyon, CA (US); Melroy E. D'Souza, Rancho Santa Margarita, CA (US); Sandie E. Pollman, Mission Viejo, CA (US)

(73) Assignee: Gateway Inc., Irvine, CA (US)

( * ) Notice: Subject to any disclaimer, the term of this patent is extended or adjusted under 35 U.S.C. 154(b) by 143 days.

(21) Appl. No.: 10/151,594

(22) Filed: May 20, 2002

(65) Prior Publication Data

US 2003/0214519 A1 Nov. 20, 2003

(51) Int. Cl.
*G06F 3/00* (2006.01)
(52) U.S. Cl. .................................... 715/860
(58) Field of Classification Search ............... 345/660, 345/470, 471, 472, 472.1, 472.2, 472.3, 467–469.1; 715/526, 860, 808, 865
See application file for complete search history.

(56) References Cited

U.S. PATENT DOCUMENTS

| 4,823,303 | A | | 4/1989 | Terasawa ..................... 364/521 |
|---|---|---|---|---|
| 5,157,768 | A | | 10/1992 | Hoeber et al. ............... 395/157 |
| 5,341,466 | A | | 8/1994 | Perlin et al. ................. 395/139 |
| 5,533,182 | A | * | 7/1996 | Bates et al. .................. 345/727 |
| 5,625,782 | A | | 4/1997 | Soutome et al. ............. 395/341 |
| 5,694,151 | A | * | 12/1997 | Johnston et al. ............. 715/860 |
| 5,754,348 | A | * | 5/1998 | Soohoo ....................... 359/802 |
| 5,754,873 | A | * | 5/1998 | Nolan .......................... 715/527 |
| 5,838,323 | A | * | 11/1998 | Rose et al. ................... 715/526 |
| 5,933,843 | A | * | 8/1999 | Takai .......................... 715/526 |
| 5,960,448 | A | * | 9/1999 | Reichek et al. .............. 715/526 |
| 5,973,694 | A | | 10/1999 | Steele et al. ................. 345/349 |
| 6,026,409 | A | * | 2/2000 | Blumenthal ............... 707/104.1 |
| 6,046,722 | A | | 4/2000 | McKiel, Jr. .................. 345/145 |
| 6,055,531 | A | | 4/2000 | Bennett et al. ................. 707/5 |
| 6,121,970 | A | | 9/2000 | Guedalia ..................... 345/357 |
| 6,185,592 | B1 | * | 2/2001 | Boguraev et al. ........... 715/531 |
| 6,199,042 | B1 | | 3/2001 | Kurzweil ..................... 704/260 |
| 6,229,536 | B1 | | 5/2001 | Alexander et al. .......... 345/340 |
| 6,563,913 | B1 | * | 5/2003 | Kaghazian ............... 379/93.24 |
| 6,704,034 | B1 | * | 3/2004 | Rodriguez et al. .......... 715/860 |
| 2002/0143826 | A1 | * | 10/2002 | Day et al. .................... 707/526 |
| 2003/0006995 | A1 | * | 1/2003 | Smith et al. ................. 345/671 |
| 2003/0020749 | A1 | * | 1/2003 | Abu-Hakima et al. ...... 345/752 |
| 2003/0068088 | A1 | * | 4/2003 | Janakiraman ............... 382/229 |

* cited by examiner

*Primary Examiner*—Ryan Yang
(74) *Attorney, Agent, or Firm*—Ross Hunt, Jr.; Stiles & Harbison PLLC

(57) ABSTRACT

Systems, methods and apparatus are provided through which meaningful or semantic portions of displayed visual information, are modified in order to improve their visual perception by a user. In some embodiments, the meaningful portion is limited to a word, a plurality of words, a phrase, a sentence, or a paragraph of text of the information. In some embodiments, the meaningful portion is predefined. In some embodiments, the meaningful portion is dynamically modified based on context of the text, and/or prior use. In some embodiments, the modification includes modifying an attribute of the text, such as size, color, and/or font.

28 Claims, 7 Drawing Sheets

SYSTEMS, METHODS AND APPARATUS FOR MAGNIFYING PORTIONS OF A DISPLAY

FIELD OF THE INVENTION

This invention relates generally to enhancements to computers to aid users in viewing displayed information on a computer display, and more particularly to magnifying meaningful portions of displayed information on the screen of a computer for easier viewing.

BACKGROUND OF THE INVENTION

Computers are very useful, if not necessary, tools involving people in society. Computers communicate information to human users through a variety of senses, including the visual sense wherein information is displayed on a computer display. Computers communicate a significant portion of the communicated information visually.

Tens of millions of people in the world have significant vision impairment. Computer users having vision impairment are disadvantaged in their use of computers. As an indication of the significance of this disadvantage, some countries such as United States require Federal agencies to make their electronic and information technology accessible to people with visual disabilities.

Conventional computers are difficult to use by people with a visual impairment. For example, the display devices do not allow the user to readily increase the size of displayed text/and or graphic information to allow people with visual impairment to readily perceive the information. Even users without visual impairment have a need to increase the size of displayed information when the information is very small, or not clear at its current size of display.

In some applications, the size of a region or area of the display of information is increased. The region is defined in terms of space, and/or physical distance. Examples of a region are a one-inch radius circle or a 1" square. The increased size effectively "magnifies" the region. The magnified information is displayed in a window that typically overlays the non-magnified information. Conventionally, the window is centered over the portion of region information that is magnified. In some embodiments, the region is selected or identified from a cursor position on the display, the position being directed or controlled by a pointing device. Figuratively speaking, a centered window that magnifies the underlying information acts as a magnifying glass. At higher magnifications, only a fragment of a sentence, or worse, fragments of several sentences are enlarged at once. As a result, the user must scroll, such as by moving the cursor, to follow the sentence to its conclusion. Scrolling slows the process of reading the information. Scrolling also introduces the risk that reading comprehension is reduced by distractions by information from sentences that surround the sentence of information that is of interest to the user, and by the distraction of having to operate the scrolling function.

SUMMARY OF THE INVENTION

Meaningful portions of a computer display are identified and visually enhanced. In one embodiment, semantically relevant portions of displayed information are magnified based on cursor position. The semantically relevant portions include individual words, cells, menus, dialog boxes, tool bars, sentences and images or other graphics.

In one embodiment, a software application generating a display of a document receives the cursor position and determines the meaningful portion from content recognition and format rules of the application. The document is displayed in a first window by an application, and the magnified meaningful portion is displayed in a second window near the cursor position.

In another aspect of the present invention, an apparatus to facilitate visual perception of a document by a human user, includes a processor operably coupled to a display device to visually display the document. The apparatus also includes a pointing device to visually identify a portion of the displayed document, and a word processor application program operable on the processor. The apparatus also includes a software component operative on the processor to receive an identification of the portion of the document, to transmit the identification to the word processor application program, to receive an indication of a meaningful or semantically coherent portion that includes the identified portion of the document, and to display the meaningful or semantically coherent portion with at least one visual attribute, such as an increased point size, that facilitates visual perception of the meaningful or semantically coherent portion by a human user. In one embodiment, the word processor application program modifies the one more visual attributes of the meaningful or semantically coherent portion to facilitate the visual perception of the meaningful or semantically coherent portion by the human user.

DETAILED DESCRIPTION OF THE INVENTION

In the following detailed description of embodiments of the invention, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention. The following detailed description is, therefore, not to be taken in a limiting sense, and the scope of the present invention is defined only by the appended claims.

The detailed description is divided into five sections. In the first section, the hardware and the operating environment in conjunction with which embodiments of the invention may be practiced are described. In the second section, a system level overview of the invention is presented. In the third section, methods for an embodiment of the invention are provided. In the fourth section, a particular object-oriented Internet-based implementation of the invention is described. Finally, in the fifth section, a conclusion of the detailed description is provided.

Hardware and Operating Environment

Figure 1:
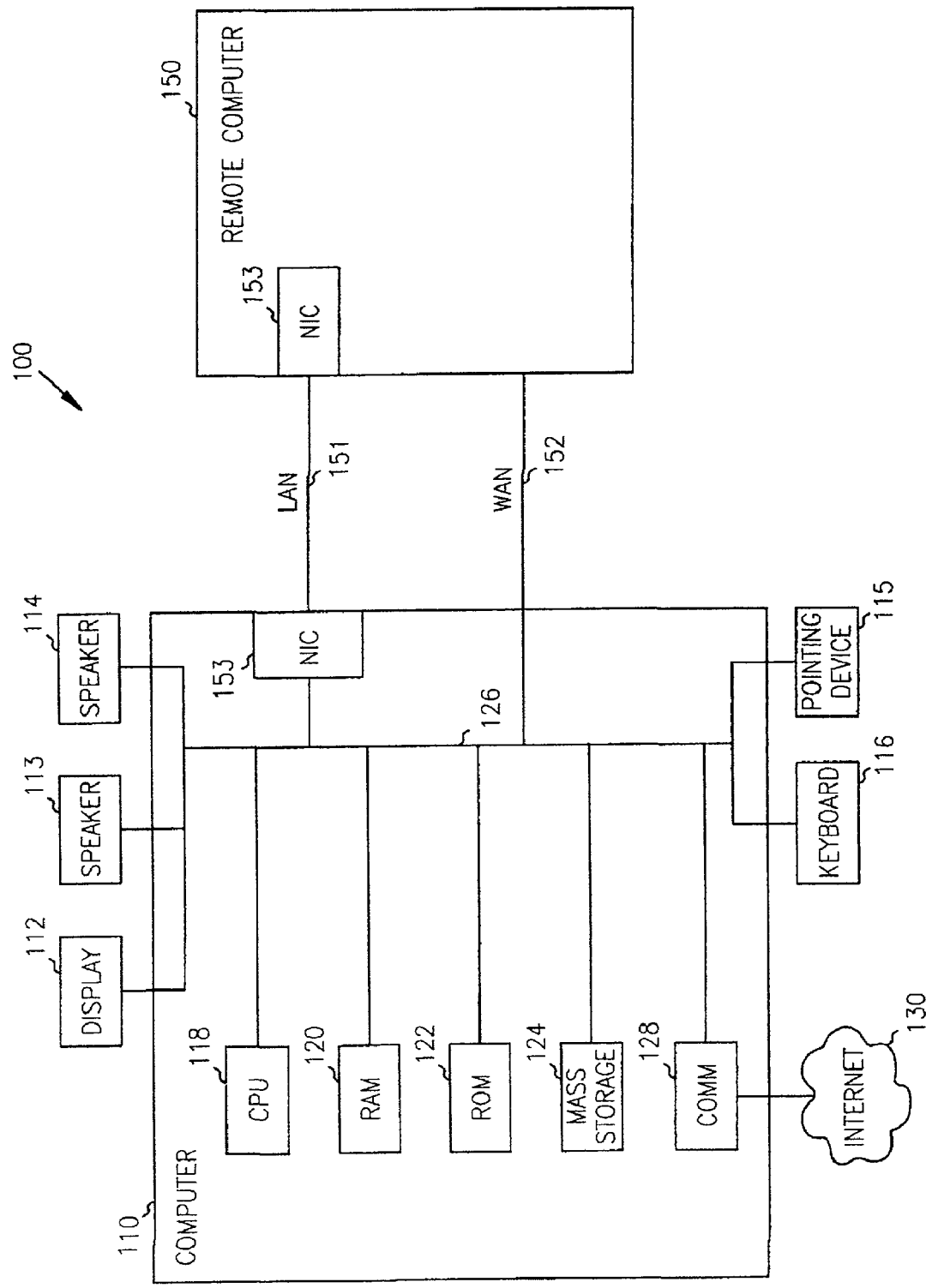
FIG. 1 is a block diagram of the hardware and operating environment in which different embodiments of the invention can be practiced.

FIG. 1 is a block diagram of the hardware and operating environment 100 in which different embodiments of the invention can be practiced. The description of FIG. 1 provides an overview of computer hardware and a suitable computing environment in conjunction with which some embodiments of the present invention can be implemented. Embodiments of the present invention are described in terms of a computer executing computer-executable instructions. However, some embodiments of the present invention can be implemented entirely in computer hardware in which the computer-executable instructions are implemented in read-only memory. One embodiment of the invention can also be implemented in client/server computing environments where remote devices that are linked through a communications network perform tasks. Program modules can be located in both local and remote memory storage devices in a distributed computing environment.

Computer 110 is operatively coupled to display device 112, pointing device 115, and keyboard 116. Computer 110 includes a processor 118, commercially available from Intel, Motorola, Cyrix and others, random-access memory (RAM) 120, read-only memory (ROM) 122, and one or more mass storage devices 124, and a system bus 126, that operatively couples various system components including the system memory to the processing unit 118. Mass storage devices 124 are more specifically types of nonvolatile storage media and can include a hard disk drive, a floppy disk drive, an optical disk drive, and a tape cartridge drive. The memory 120, 122, and mass storage devices, 124, are types of computer-readable media. A user enters commands and information into the computer 110 through input devices such as a pointing device 115 and a keyboard 116. Other input devices (not shown) can include a microphone, joystick, game pad, satellite dish, scanner, or the like. The processor 118 executes computer programs stored on the computer-readable media. Embodiments of the present invention are not limited to any type of computer 110. In varying embodiments, computer 110 comprises a PC-compatible computer, a MacOS®-compatible computer or a UNIX®-compatible computer. The construction and operation of such computers are well known within the art.

Furthermore, computer 110 can be communicatively connected to the Internet 130 via a communication device 128. Internet 130 connectivity is well known within the art. In one embodiment, a communication device 128 is a modem that responds to communication drivers to connect to the Internet via what is known in the art as a "dial-up connection." In another embodiment, a communication device 128 is an Ethernet® or similar hardware network card connected to a local-area network (LAN) that itself is connected to the Internet via what is known in the art as a "direct connection" (e.g., T1 line, etc.).

Computer 110 can be operated using at least one operating environment to provide a graphical user interface including a user-controllable pointer. Such operating environments include operating systems such as versions of the Microsoft Windows® and Apple MacOS® operating systems well-known in the art. Embodiments of the present invention are not limited to any particular operating environment, however, and the construction and use of such operating environments are well known within the art. Computer 110 can have at least one web browser application program executing within at least one operating environment, to permit users of computer 110 to access intranet or Internet world-wide-web pages as addressed by Universal Resource Locator (URL) addresses. Such browser application programs include Netscape Navigator® and Microsoft Internet Explorer®).

Display device 112 permits the display of information, including computer, video and other information, for viewing by a user of the computer. Embodiments of the present invention are not limited to any particular display device 112. Such display devices include cathode ray tube (CRT) displays (monitors), as well as flat panel displays such as liquid crystal displays (LCD's). Display device 112 is connected to the system bus 126. In addition to a monitor, computers typically include other peripheral input/output devices such as printers (not shown), speakers, pointing devices and a keyboard. Speakers 113 and 114 provide the audio output of signals. Speakers 113 and 114 are also connected to the system bus 126. Pointing device 115 permits the control of the screen pointer provided by the graphical user interface (GUI) of operating systems such as versions of Microsoft Windows®. Embodiments of the present invention are not limited to any particular pointing device 115. Such pointing devices include mouses, touch pads, trackballs, remote controls and point sticks. Finally, keyboard 116 permits entry of textual information into computer 110, as known within the art, and embodiments of the present invention are not limited to any particular type of keyboard.

The computer 110 can operate in a networked environment using logical connections to one or more remote computers, such as remote computer 150. These logical connections are achieved by a communication device coupled to, or a part of, the computer 110. Embodiments of the present invention are not limited to a particular type of communications device. The remote computer 150 can be another computer, a server, a router, a network PC, a client, a peer device or other common network node. The logical connections depicted in FIG. 1 include a local-area network (LAN) 151 and a wide-area network (WAN) 152. Wireless networks, such as those implementing the IEEE 802.11 standards may also be utilized. Such networking environments are commonplace in offices, enterprise-wide computer networks, intranets and the Internet.

When used in a LAN-networking environment, the computer 110 and remote computer 150 are connected to the local network 151 through a network interface or adapter 153, which is one type of communications device. When used in a conventional WAN-networking environment, the computer 110 and remote computer 150 communicate with a WAN 152 through modems (not shown). The modem, which can be internal or external, is connected to the system bus 126. In a networked environment, program modules depicted relative to the computer 110, or portions thereof, can be stored in the remote memory storage device.

System Level Overview

Figure 2:
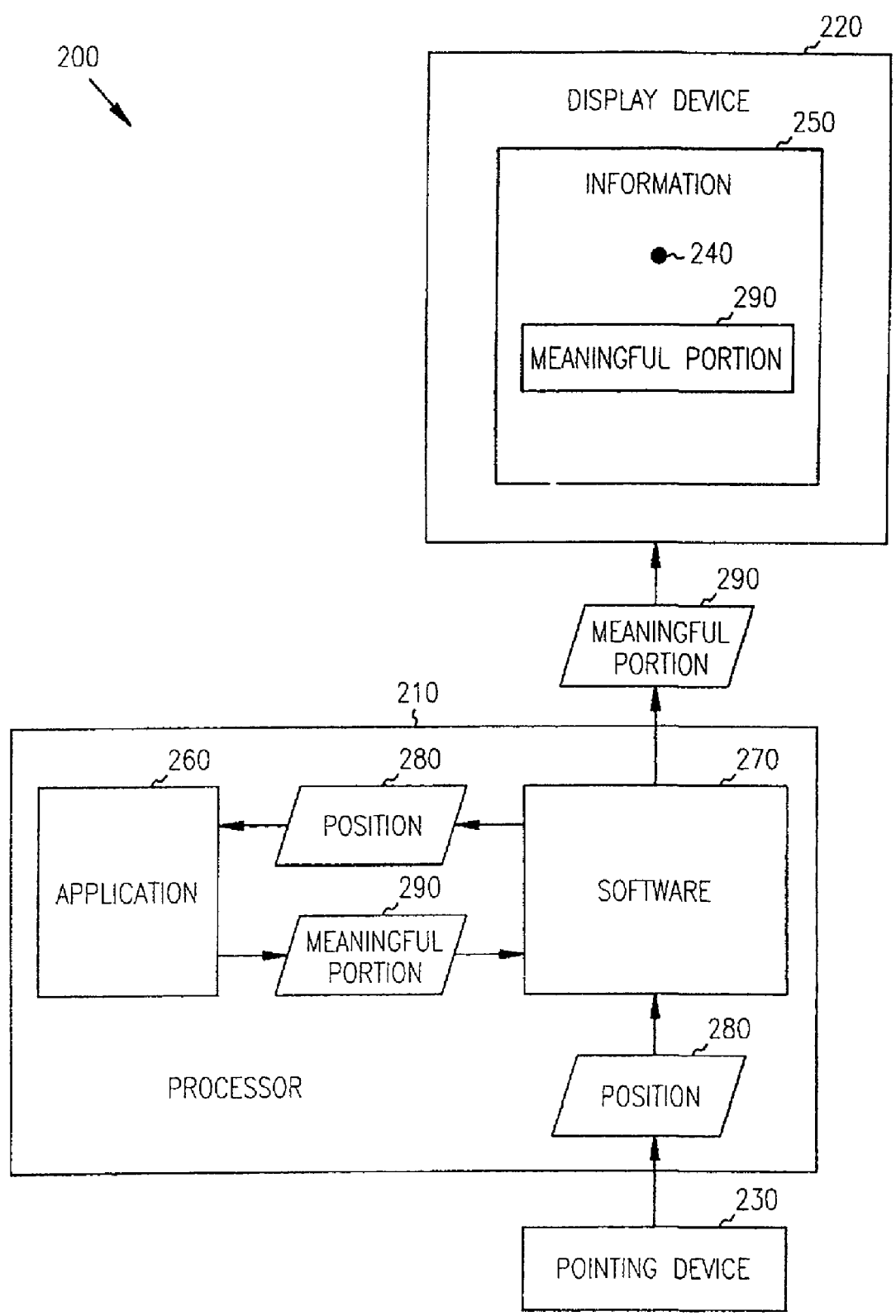
FIG. 2 is a diagram illustrating a system-level overview of an embodiment of the invention.

FIG. 2 is a block diagram that provides a system level overview of the operation of embodiments of the present invention. Embodiments of the invention are described as operating in a multi-processing, multi-threaded operating environment on a computer, such as computer 110 in FIG. 1.

System 200 is a system to facilitate visual perception of information by a human user. System 200 includes a processor 210, such as processor 118 in FIG. 1. System 200 also includes a display device 220 to visually display information 250. The display device 220 is operably coupled to the processor 210. System 200 also includes a pointing device 230, such as pointing device 115 in FIG. 1 to visually identify a position 240 in the displayed information 250. The position 240 identifies a portion (not shown) of the displayed information 250. The pointing device 230 is operably coupled to the processor 210.

System 200 also includes a computer application program 260, to manage the information. The computer application program 260 is operable on the processor 210. One example of the computer application program 260 is a word processor computer application program, such as Microsoft Word. Another example of the computer application program 260 is a graphical image display program, such as Adobe Acrobat.

System 200 also includes software 270 that is operative on the processor 210 to receive the position 240. The software 270 is also operative to transmit the position 240 to the computer application program 260. The software 270 is also operative to receive from the application 260 an ID 280 of a meaningful portion 290 of the displayed information 250 that includes the identified portion of information. The software 270 is also operative to direct display of the meaningful information 290 with visual attributes that facilitate and/or improve visual perception of the meaningful portion 290 of displayed information 250 by a human user.

The meaningful portion 290 includes a semantically coherent portion of the displayed information 250. Examples of the meaningful portion 290 includes a whole word, a plurality of words, a whole phrase, a whole sentence, a plurality of sentences, a whole paragraph, or a plurality of paragraphs. Tag based language documents provide tags identifying portions of text, such as sentences or paragraphs. In some embodiments, the tags are used to quickly identify meaningful portions. Some word processing software includes semantic analysis functions, which also identify portions of documents. Such software is either modified to identify meaningful portions, or the output of the software is used in further software to identify portions that may be meaningful portions.

In further embodiments, the displayed information comprises a dropdown menu, where the user can roll through the menu in a magnification window. Cells in a spreadsheet are also magnified as desired. OCR (optical character recognition) converted text from any source is also similarly magnified in a separate window. Dialog boxes are also magnified in their entirety if the resulting magnification window smaller than a certain desired percentage of the display screen. Otherwise, semantic sub-portions, such as buttons are magnified. Floating toolbars or toolbar chunks are similarly magnified. Displayed information is generally referred to as a document in this application for convenience.

In some embodiments, the visual attributes that facilitate and/or improve visual perception of the meaningful portion 290 include "magnification" of the meaningful portion 290. Magnification is an increased point or font size of the meaningful portion 290 relative to the displayed information 250. In further embodiments, magnification includes any other means of increasing the size of displayed information, such as magnification of a bit image of text, or other displayed information.

The system level overview of the operation of an embodiment of the invention has been described in this section of the detailed description. While the invention is not limited to any particular application program or pointing device, for sake of clarity a simplified application program and pointing device has been described.

Methods of an Embodiment of the Invention

In the previous section, a system level overview of the operation of an embodiment of the invention was described. In this section, the particular methods of such an embodiment are described by reference to a series of flowcharts. Describing the methods by reference to a flowchart enables one skilled in the art to develop such programs, firmware, or hardware, including such instructions to carry out the methods on a suitable processor executing the instructions from computer-readable media. Similarly, the methods performed by the server computer programs, firmware, or hardware are also composed of computer-executable instructions. Methods 300 and 500 are performed by a program executing on, or performed by firmware or hardware that is a part of, a computer, such as computer 110 in FIG. 1.

Figure 3:
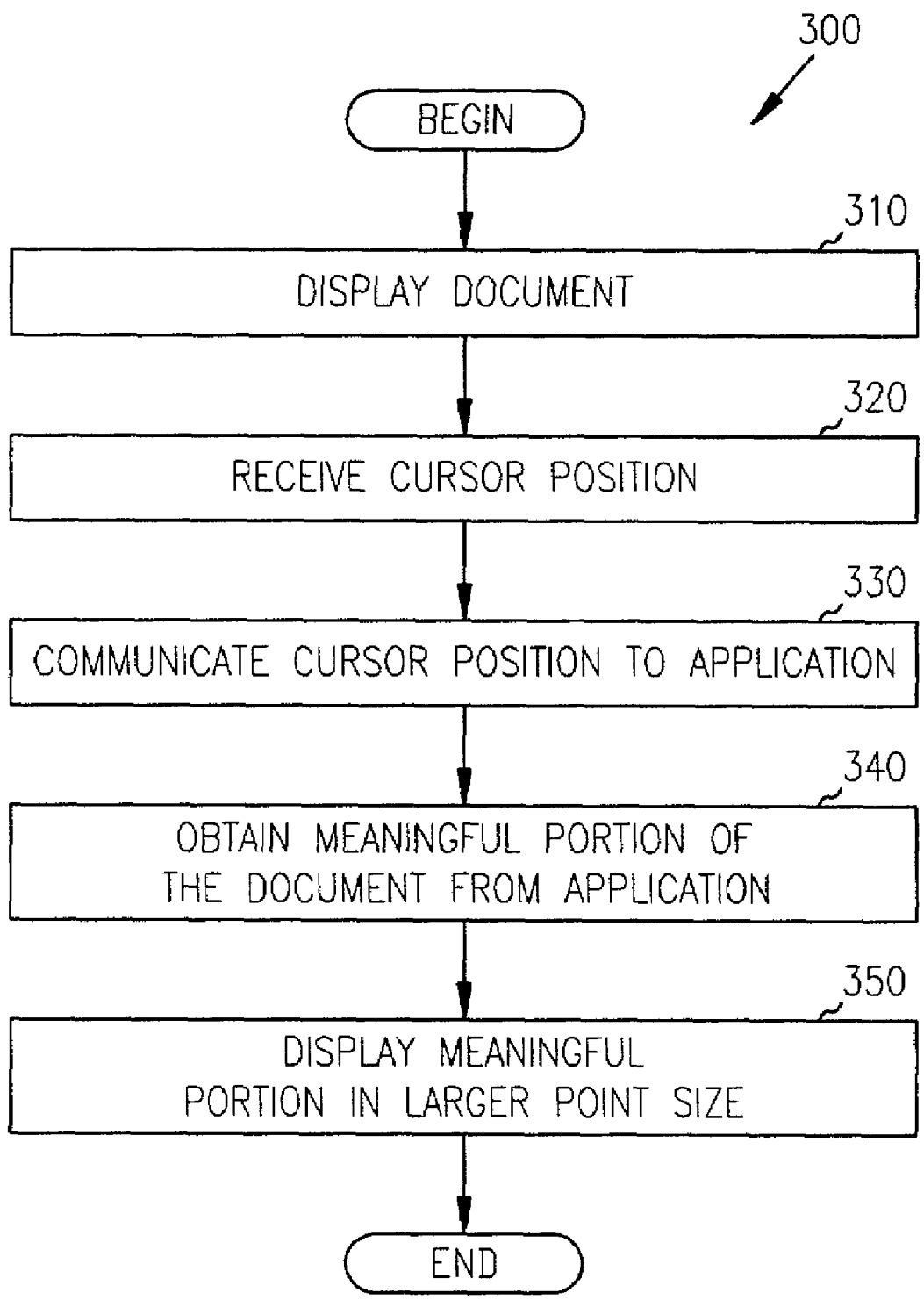
FIG. 3 is a flowchart of a method of magnifying elements of a display output based on content, according to an embodiment of the invention.

FIG. 3 is a flowchart of a method 300 of magnifying elements of a display output based on content, according to an embodiment of the invention.

Method 300 includes displaying a document, in block 310. In some embodiments, the document is displayed in a first point size. The document is associated with a computer application program, such as a word processor. In some embodiments, where the display is implemented using a windowing graphical user interface (GUI), the document is displayed in a first window by the application and the document is associated with a plurality of cursor positions in the GUI.

Subsequently, method 300 includes receiving one of the plurality of cursor positions, in block 320. The cursor position that is within the first window.

In some embodiments, method 300 also includes communicating the received cursor position, in block 330. In some embodiments, the communicating in block 330 also includes communicating an indication of a meaningful coherent portion of the document to the software application. A meaningful coherent portion includes a whole word, a plurality of words, a whole phrase, a whole sentence, a plurality of sentences, a whole paragraph, or a plurality of paragraphs.

Method 300 also includes obtaining an indication of a meaningful portion of the document from the software application, in block 340. One example of an indication is an address pointer. The meaningful portion includes or encompasses the one cursor position, wherein the software application determines the meaningful portion from content recognition and format rules that are interpreted by the software application. The actual text of the meaningful portion is obtained from the indication of the meaningful portion. Thereafter, method 300 includes displaying the meaningful portion with a point size that is greater than the first point size, in block 350. In some embodiments, the displaying of the meaningful portion in block 350 includes displaying the meaningful portion in a second window, in which the second window is displayed near the cursor position.

In contrast to the present invention, conventional systems obtain a portion of the document based on an area of the display. In conventional systems, the area of the display often overlaps, or cuts across semantically meaningful and coherent portions of the document, making comprehension by a user reading the display very difficult. The present invention solves that problem by obtaining and displaying semantically meaningful and coherent portions of the document, thus facilitating comprehension by a user reading the display.

Figure 4:
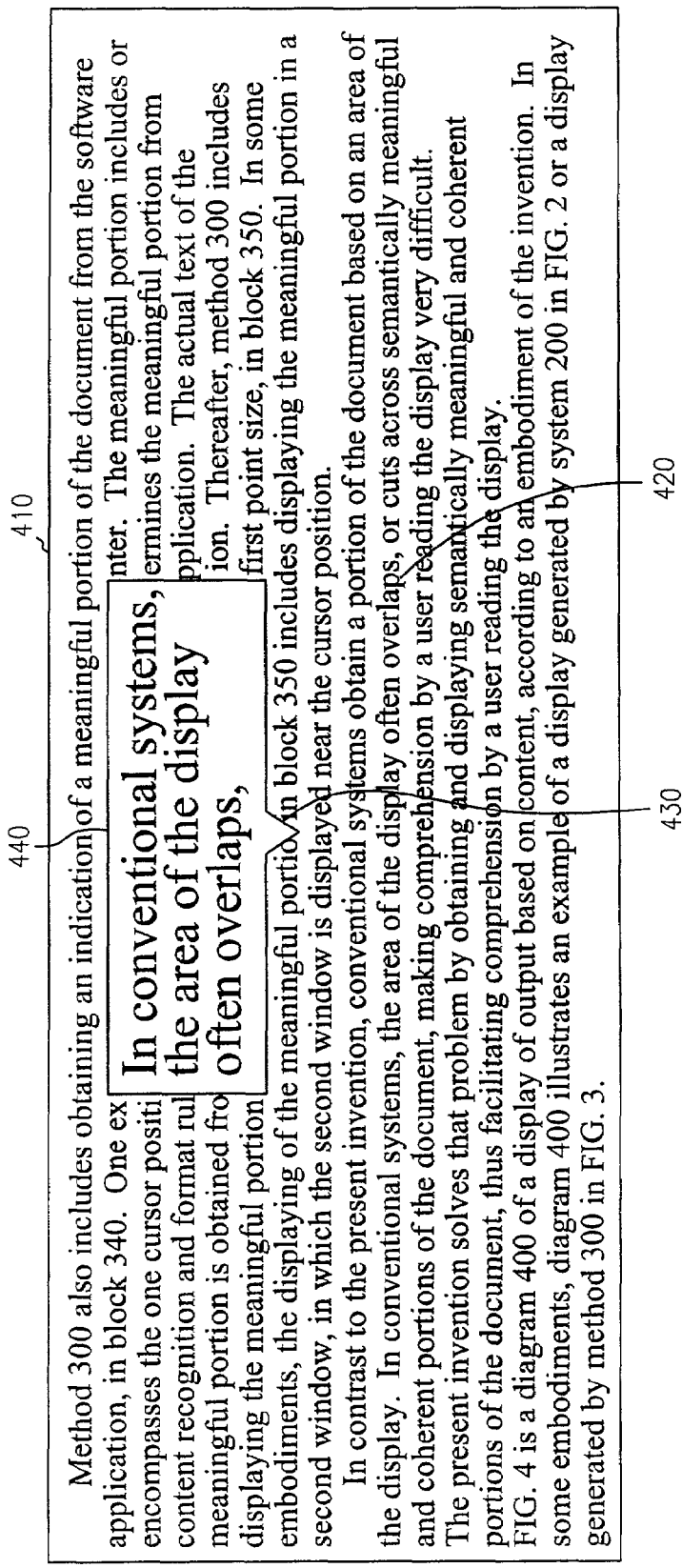
FIG. 4 is a diagram of a display of output based on content, according to an embodiment of the invention.

FIG. 4 is a diagram 400 of a display of output based on content, according to an embodiment of the invention. In some embodiments, diagram 400 illustrates an example of a display generated by system 200 in FIG. 2 or a display generated by method 300 in FIG. 3.

Diagram 400 includes a first window 410 of a word processor application computer program. The first window 410 includes the text 420 "In conventional systems, the area of the display often overlaps," A portion of text 420 is selected by a user by positioning a mouse cursor over any portion of the text such as at 430 and then clicking the left button or other selected button on a mouse or other pointing device. The mouse cursor position 430 is communicated to an application, such as in action 330 in FIG. 3.

Subsequently, the word processor application identifies the entire coherent meaningful portion of text that encompasses the cursor position. In this example, the coherent meaningful portion is predetermined to be part of a sentence, as a result the identified coherent meaningful portion that encompasses the cursor position is the sentence "In conventional systems, the area of the display often overlaps," The portion of the sentence is received, such as in action 340 in FIG. 3, and is displayed, such as in action 350 in FIG. 3 in a second window 440. In this example, a comma was used to truncate the sentence to a length that is amendable to magnification. A longer sentence may cause obstruction of more of the other text in the window, or may simply be too much text to be displayed on the screen in a magnified state. A threshold number of letters is used in one embodiment to limit the portion to be magnified, and semantic parsing of the sentence is used to display a meaningful portion within that limit.

Figure 5:
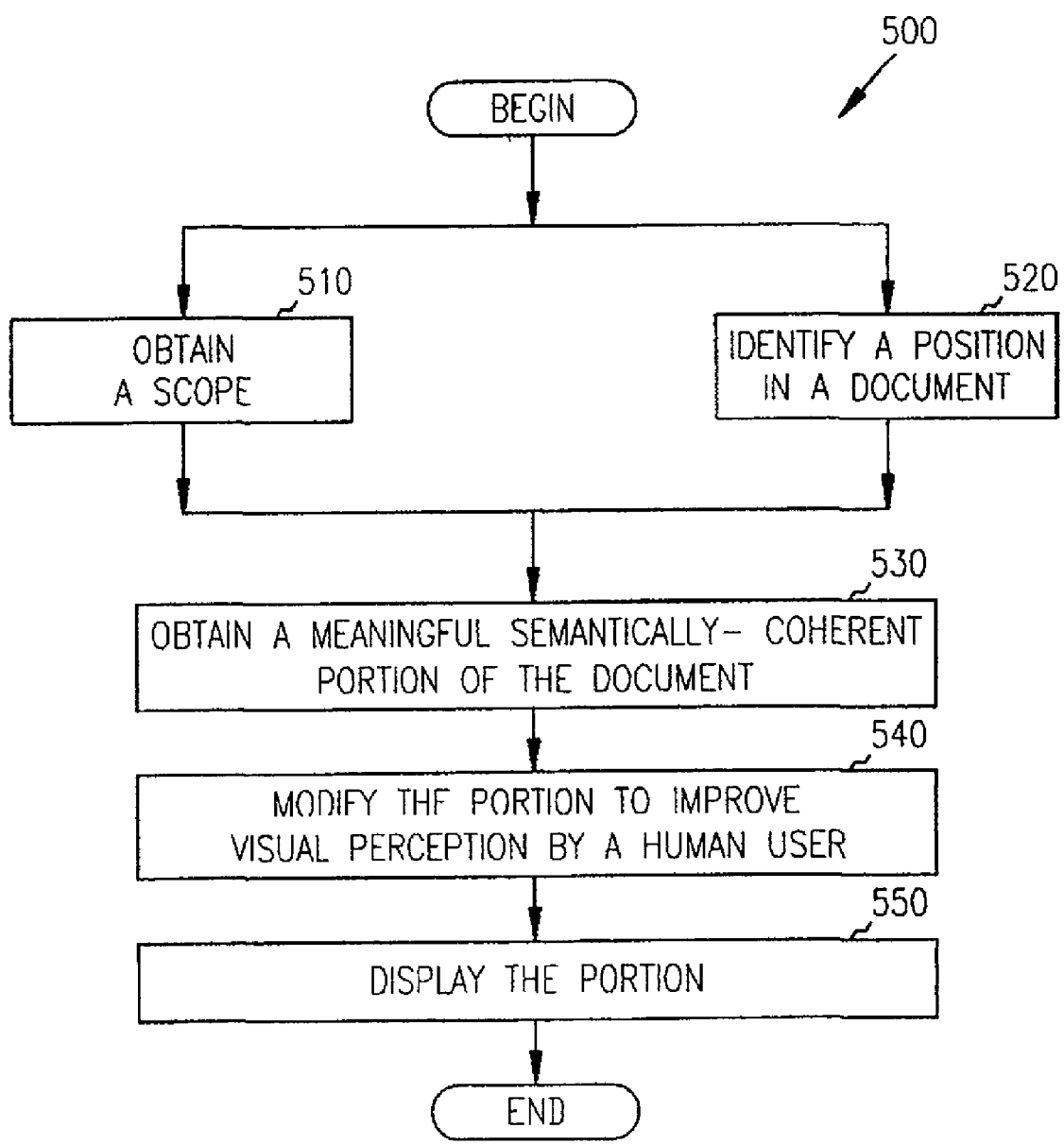
FIG. 5 is a flowchart of a method for facilitating visual perception of a meaningful or semantically-coherent portion of information by a human user, according to an embodiment of the invention.

FIG. 5 is a flowchart of a method 500 for facilitating visual perception of a meaningful or semantically-coherent portion of information by a human user, according to an embodiment of the invention. Examples of the scope of the meaningful or semantically-coherent portion of the document are a word, a plurality of words, a phrase, a sentence, a paragraph, and/or a plurality of paragraphs.

In some embodiments of method 500, the scope of the meaningful or semantically-coherent portion of the document is predefined. In other embodiments of method 500, method 500 includes obtaining the predefined scope of the meaningful or semantically-coherent portion, in block 510.

In some embodiments, method 500 includes identifying a position in a document, in block 520. One example of the position is a position identified by a pointing device operated by a human user.

In some embodiments, method 500 includes obtaining a meaningful or semantically-coherent portion of the document, in block 530. The portion is obtained in reference to the scope and the position. The meaningful or semantically-coherent portion includes the position in the document. In some embodiments, the portion is obtained from an application program associated with the document. For example, Microsoft Word is associated with documents having a .doc extension in the name of the document file. The .doc extension indicates that the document file is formatted for use by Microsoft Word. Microsoft Word has the ability to parse, modify, and locate information in such a document file. In some embodiments the meaningful or semantically-coherent portion of the document is also modified in a manner that facilitates visual perception of the portion by a human user before the meaningful or semantically-coherent portion of the document is obtained from Microsoft Word.

In some embodiments, method 500 includes modifying the meaningful or semantically-coherent portion based on a context and/or a prior use of the portion, in a manner that facilitates visual perception of the portion by a human user, in block 540. In varying embodiments, the manner that facilitates visual perception by a human user is modifying an attribute, such as a color, a point size, and/or a font, in a manner that facilitates visual perception by a human user. One example of modifying the portion in a manner that facilitates visual perception of the portion by a human user is, increasing the point size. Another example is changing the color to red. In some embodiments, the modifying in block 540 is performed by the application program associated with the document, before portion is obtained in block 530.

Subsequently, method 500 also includes displaying the modified portion, in block 550. Thus, method 500 facilitates visual perception of a meaningful or semantically-coherent portion of information by a human user.

In some embodiments, methods 300 and 500 are implemented as a computer data signal embodied in a computer readable medium such as a carrier wave, that represents a sequence of instructions which, when executed by a processor, such as processor 118 in FIG. 1, cause the processor to perform the respective method. In other embodiments, methods 300 and 500 are implemented as a computer-accessible medium having executable instructions capable of directing a processor, such as processor 118 in FIG. 1, to perform the respective method. In varying embodiments, the medium is a magnetic medium, an electronic medium, or an optical medium.

Word Processor Implementation

Figure 6:
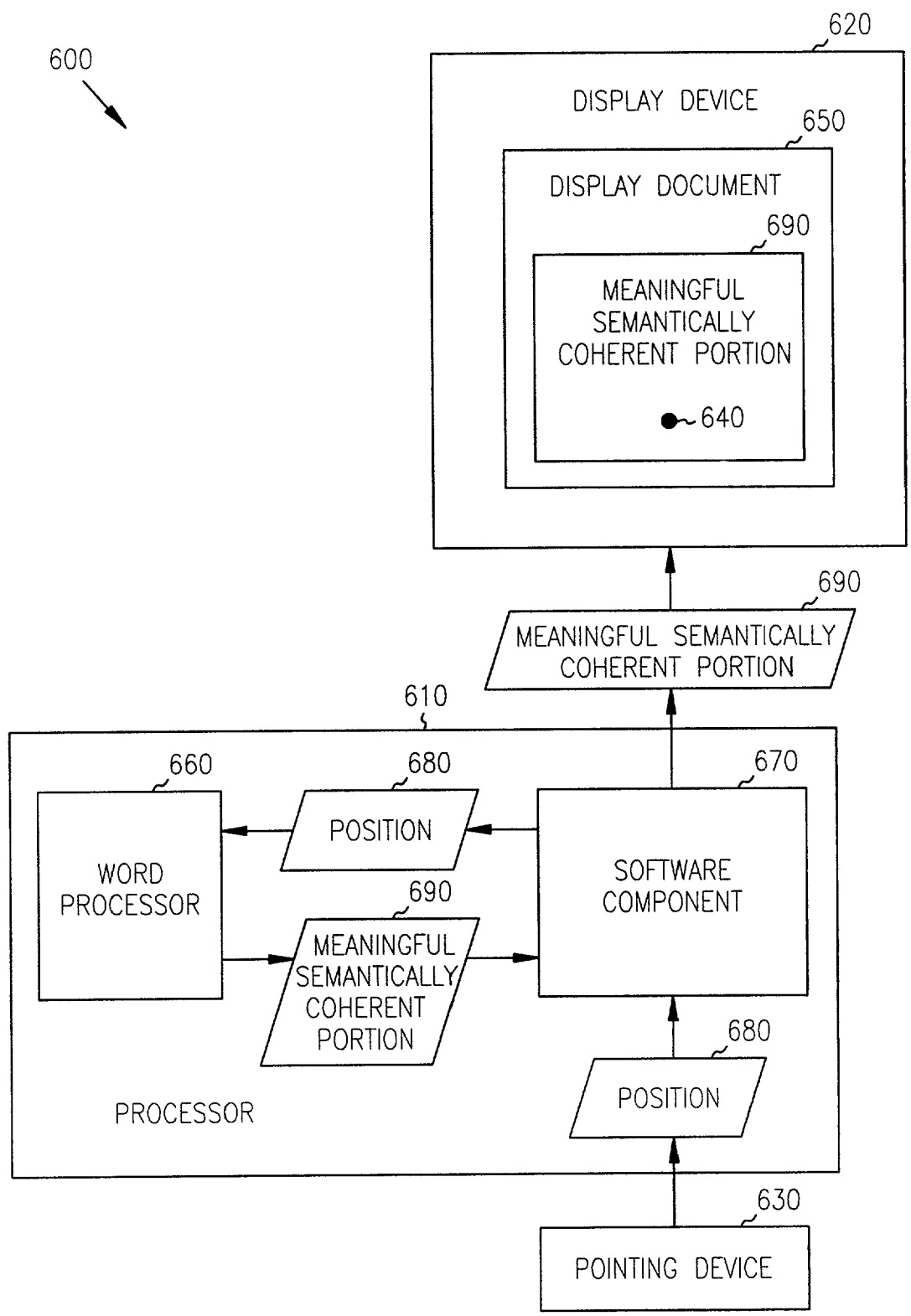
FIG. 6 is a block diagram of an apparatus to facilitate visual perception of information by a human user, according to an embodiment of the invention.
Figure 7:
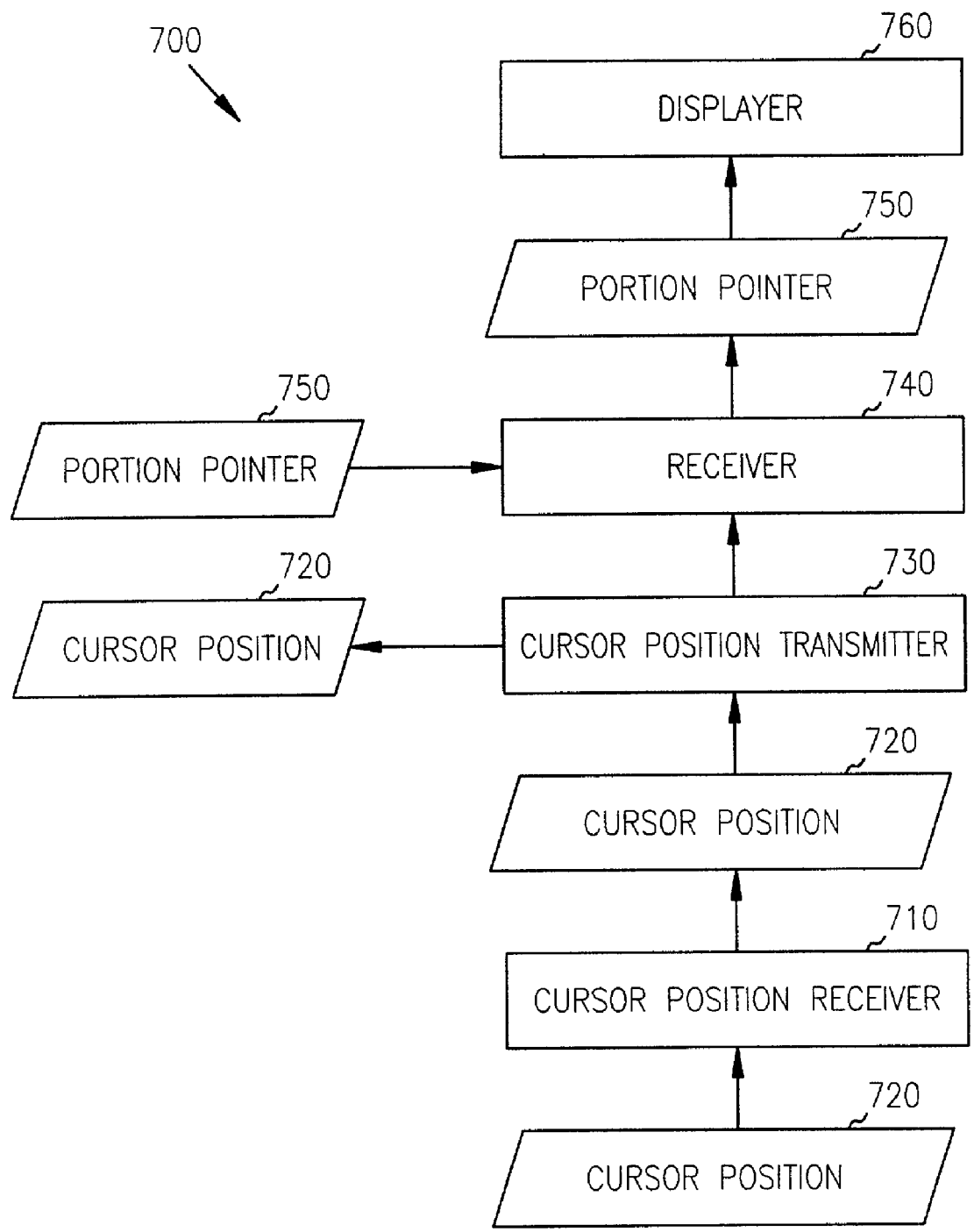
FIG. 7 is a block diagram of an apparatus to facilitate visual perception of information by a human user, according to an embodiment of the invention.

Referring to FIGS. 6 and 7, a particular implementation 600 of the invention is described in conjunction with the system overview in FIG. 2 and the methods described in conjunction with FIGS. 2–5.

FIG. 6 is a block diagram of an apparatus 600 to facilitate visual perception of information by a human user, according to an embodiment of the invention. Apparatus 600 includes a processor 610, such as processor 118 in FIG. 1. Apparatus 600 also includes a display device 620 to visually display information 650. The display device 620 is operably coupled to the processor 610. Apparatus 600 also includes a pointing device 630, such as pointing device 115 in FIG. 1 to visually identify a position 640 in the displayed document 650. The position 640 identifies a portion (not shown) of the displayed document 650. The pointing device 630 is operably coupled to the processor 610.

Apparatus 600 also includes a word processor 660, to manage the information. The word processor 660 is operable on the processor 610. One example of the word processor 660 is Microsoft Word.

Apparatus 600 also includes a software component 670 that is operative on the processor 610 to receive the position 640. The software component 670 is also operative to transmit the position 640 to the word processor 660. The software component 670 is also operative to receive from the application 660 an ID of a meaningful or semantically-coherent portion 690 of the displayed document 650 that includes the position 640 in the displayed document 650. Examples of the meaningful or semantically-coherent portion 690 include a whole word, a plurality of words, a whole phrase, a whole sentence, a plurality of sentences, a whole paragraph, or a plurality of paragraphs.

The software component 670 is also operative to direct display of the meaningful or semantically-coherent portion 690 with visual attributes that facilitate and/or improve visual perception of the meaningful or semantically-coherent portion 690 of the displayed document 650 by a human user. In some embodiments, the visual attributes that facilitate and/or improve visual perception of the meaningful or semantically-coherent portion 690 include "magnification" of the meaningful or semantically-coherent portion 690. Magnification is an increased point or font size of the meaningful or semantically-coherent portion 690 relative to the displayed document 650. Apparatus 600 solves the need in the art to magnify portions of the displayed document 650 in a display according to meaningful or semantically-coherent, coherent portions 690 of the displayed document 650. One embodiment of software component 670 is disclosed in FIG. 7.

FIG. 7 is a block diagram of an apparatus 700 to facilitate visual perception of information by a human user, according to an embodiment of the invention. Apparatus 700 is one embodiment of software means 270 in FIG. 2 and software component 670 in FIG. 6.

Apparatus 700 includes a receiver 710 of a cursor position 720 of the document from a pointing device. In one embodiment, the pointing device is a mouse. Examples of the document include information 250 in FIG. 2 and displayed document 650 in FIG. 6.

Apparatus 700 also includes a transmitter 730 of the cursor position 720 to a word processor application program (not shown). One example of the word processor application is word processor 660 in FIG. 6. The transmitter 730 is operably coupled to the receiver 710 of the cursor position 710.

Apparatus 700 also includes a receiver 740 of a pointer 750 of a meaningful or semantically coherent portion of the document (not shown). The meaningful or semantically coherent portion includes or encompasses the cursor position 720. The meaningful or semantically coherent portion is associated with at least one visual attribute that facilitates visual perception of the meaningful or semantically coherent portion by a human user. One embodiment of the at least one visual attribute is a point size. The receiver 740 of the pointer 750 is operably coupled to the transmitter 730.

Apparatus 700 also includes a displayer 760 of the meaningful or semantically coherent portion. In one embodiment, the displayer 760 is a software component that transmits the pointer 750 of the meaningful or semantically coherent portion to a windowing display management component of an operating system. The displayer 760 is operably coupled to the receiver 740 of the pointer 750.

The apparatus 600 components of the software component 670 or the word processor 660 and apparatus 700 can be embodied as computer hardware circuitry or as a computer-readable program, or a combination of both.

More specifically, in the computer-readable program embodiment, the programs can be structured in an object-orientation using an object-oriented language such as Java, Smalltalk or C++, and the programs can be structured in a procedural-orientation using a procedural language such as COBOL or C. The software components communicate in any of a number of means that are well-known to those skilled in the art, such as application program interfaces (API) or interprocess communication techniques such as remote procedure call (RPC), common object request broker architecture (CORBA), Component Object Model (COM), Distributed Component Object Model (DCOM), Distributed System Object Model (DSOM) and Remote Method Invocation (RMI). The components execute on as few as one computer as in computer 110 in FIG. 1, or on at least as many computers as there are components.

CONCLUSION

Systems, methods and apparatus for magnifying portions of displayed information on a computer display screen have been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. For example, although described in functional terms, one of ordinary skill in the art will appreciate that the invention can be implemented in an object-oriented design environment or any other design environment that provides the required relationships.

In particular, one of skill in the art will readily appreciate that the names of the methods and apparatus are not intended to limit embodiments of the invention. Furthermore, additional methods and apparatus can be added to the components, functions can be rearranged among the components, and new components to correspond to future enhancements and physical devices used in embodiments of the invention can be introduced without departing from the scope of embodiments of the invention. One of skill in the art will readily recognize that embodiments of the invention are applicable to future communication devices, different file systems, and new data types.

The terminology used in this application with respect to is meant to include all software and communication environments and alternate technologies which provide the same functionality as described herein. Therefore, it is manifestly intended that this invention be limited only by the following claims and equivalents thereof.

We claim:

1. A method of displaying information, the method comprising:
   displaying a document;
   determining a cursor position relative to the display of the document; identifying a semantically-coherent portion of the document relative to the cursor position by:
      identifying a coherent portion of the document that encompasses the cursor position and is within a predefined scope for the semantically-coherent portion;
      limiting the coherent portion to a threshold number of letters to produce a limited coherent portion; and
      semantically parsing the limited coherent portion to produce the semantically-coherent portion of the document; and displaying a visually enhanced version of the semantically-coherent portion.

2. The method of claim 1, wherein the document is displayed in a first window, and the visually enhanced semantically-coherent portion of the document is displayed in a second window.

3. The method of claim 2 wherein the second window is positioned to minimize overlapping of text in the document corresponding to the semantically-coherent portion.

4. The method of claim 1, wherein the semantically-coherent portion is visually enhanced by magnification.

5. A computer-accessible medium having executable instructions to cause a computer to perform a method of displaying information, the method comprising:
displaying a document;
determining a cursor position relative to the display of the document;
identifying a semantically-coherent portion of the document relative to the cursor position by:
identifying a coherent portion of the document that encompasses the cursor position and is within a predefined scope for the semantically-coherent portion;
limiting the coherent portion to a threshold number of letters to produce a limited coherent portion; and
semantically parsing the limited coherent portion to produce the semantically-coherent portion of the document; and
displaying a visually enhanced version of the semantically-coherent portion.

6. The computer-accessible medium of claim 5, wherein the semantically-coherent portion is visually enhanced by magnification.

7. A display of a semantically-coherent portion of information to facilitate visual perception of the portion by a human user, produced by the process comprising:
receiving a cursor position in a document displayed by an application, the cursor position being within a first window;
transmitting the cursor position to a software application;
obtaining an address pointer of a semantically-coherent portion of the document that includes the cursor position from the software application, wherein the software application determines the semantically-coherent portion by:
identifying a coherent portion of the document that encompasses the cursor position and is within a predefined scope for the semantically-coherent portion;
limiting the coherent portion to a threshold number of letters to produce a limited coherent portion; and
semantically parsing the limited coherent portion to produce the semantically-coherent portion of the document; and
displaying the semantically-coherent portion with visual attributes that facilitate visual perception of the semantically-coherent portion by a human user.

8. The display of claim 7, wherein the receiving further comprises receiving a cursor position in a document displayed by an application in a first window with a first point size, the cursor position being within the first window; and wherein the displaying further comprises displaying the semantically-coherent portion in a second widow with a point size that is larger than the first point size.

9. The display of claim 7, wherein method further comprises:
transmitting an indication of the type of semantically-coherent portion of the document to the software application.

10. A method of facilitating visual perception of information by a human user, the method comprising:
identifying a position in a document, said identification based on a cursor position;
obtaining a semantically-coherent portion of the document by:
identifying a coherent portion of the document that encompasses the cursor position and is within a predefined scope for the semantically-coherent portion;
limiting the coherent portion to a threshold number of letters to produce a limited coherent portion; and
semantically parsing the limited coherent portion to produce the semantically-coherent portion of the document; and
displaying the semantically-coherent portion of the document in a manner that facilitates visual perception of the semantically-coherent portion by a human user.

11. The method of claim 10 wherein the semantically-coherent portion of the document is selected from the group consisting of a word, a plurality of words, a phrase, a sentence, a paragraph, or a plurality of paragraphs.

12. The method of claim 10 wherein the method further comprises:
dynamically modifying the semantically-coherent portion based on the context of the text.

13. The method of claim 10 wherein the method further comprises:
modifying dynamically the semantically-coherent portion based on prior use of the text by a human user.

14. The method of claim 10, wherein the displaying further comprises:
displaying the semantically-coherent portion of the document with an attribute that facilitates visual perception of the semantically-coherent portion by a human user.

15. The method of claim 10, wherein the displaying further comprises:
displaying a semantically-coherent portion of the document in a point size that facilitates visual perception of the semantically-coherent portion by a human user.

16. The method of claim 10, wherein the displaying further comprises:
displaying the semantically-coherent portion of the document in a color that facilitates visual perception of the semantically-coherent portion by a human user.

17. The method of claim 10, wherein the displaying further comprises:
displaying the semantically-coherent portion of the document in a font that facilitates visual perception of the semantically-coherent portion by a human user.

18. A system to facilitate visual perception of information by a user, the system comprising:
means for displaying a document;
means for determining a cursor position relative to the display of the document;
means for identifying a semantically-coherent portion of the document relative to the cursor position by:
identifying a coherent portion of the document that encompasses the cursor position and is within a predefined scope for the semantically-coherent portion;

limiting the coherent portion to a threshold number of letters to produce a limited coherent portion; and semantically parsing the limited coherent portion to produce the semantically-coherent portion of the document; and means for displaying a magnified version of the semantically-coherent portion.

19. A system to facilitate visual perception of information by a human user, comprising:

a processor;

a display device to visually display the information, the display device operably coupled to the processor;

a pointing device to visually identify a portion of the information, the pointing device operably coupled to the processor;

an application program, to manage the information, the application program operable on the processor for identifying a semantically-coherent portion of the information that includes the identified portion of the information by:

identifying a coherent portion of the information that encompasses the identified portion of the information and is within a predefined scope for the semantically-coherent portion of said information;

limiting the coherent portion to a threshold size to produce a limited coherent portion; and semantically parsing the limited coherent portion to produce the semantically-coherent portion of the information; and software means operative on the processor to receive the identification of the portion of the information, to transmit the identification to the application program, to receive the semantically-coherent portion of the information, and to display the semantically-coherent portion of the information with at least one visual attribute that facilitates visual perception of the semantically-coherent portion of the information by a human user.

20. The system of claim 19, wherein the pointing device further comprises a mouse.

21. The system of claim 19, wherein the application program further comprises an application program to modify the at least one visual attribute of the semantically-coherent information to facilitate the visual perception of the semantically-coherent information by the human user.

22. The system of claim 21, wherein the at least one visual attribute further comprises a point size.

23. The system of claim 22, wherein the modifying further comprises increasing the point size.

24. An apparatus to facilitate visual perception of a document by a human user, comprising:

a processor;

a display device to visually display the document, the display device operably coupled to the processor;

a pointing device to visually identify a portion of the document, the pointing device operably coupled to the processor;

a word processor application program operable on the processor for identifying a semantically-coherent portion of the document that includes the identified portion of the document by:

identifying a coherent portion of the document that encompasses the identified portion of the document and is within a predefined scope for the semantically-coherent portion of said document;

limiting the coherent portion to a threshold number of letters to produce a limited coherent portion; and semantically parsing the limited coherent portion to produce the semantically-coherent portion of the document; and a software component operable on the processor to receive the identification of the portion of the document, to transmit the identification to the word processor application program, to receive the semantically-coherent portion that includes the identified portion of the document, and to display the semantically-coherent portion with at least one visual attribute that facilitates visual perception of the semantically-coherent portion by a human user.

25. The apparatus of claim 24, wherein the pointing device further comprises a mouse.

26. The apparatus of claim 25, wherein the word processor application program further comprises a word processor application program to modify the at least one visual attribute of the semantically-coherent portion to facilitate the visual perception of the semantically-coherent portion by the human user.

27. The apparatus of claim 26, wherein the at least one visual attribute further comprises a point size.

28. The apparatus of claim 27, wherein the modifying further comprises increasing the point size.

* * * * *